UNITED STATES PATENT OFFICE.

JOHN J. DUNNE, OF PHILADELPHIA, PENNSYLVANIA.

NITROGENOUS FERTILIZER AND PROCESS OF MAKING THE SAME.

SPECIFICATION forming part of Letters Patent No. 484,631, dated October 18, 1892.

Application filed February 18, 1891. Serial No. 381,964. (Specimens.)

*To all whom it may concern:*

Be it known that I, JOHN J. DUNNE, a citizen of the United States, and a resident of Philadelphia, Pennsylvania, have invented an Improvement in the Utilization of Nitrogenous Matters in Tank-Waters or Similar Liquids, of which the following is a specification.

My invention relates to the utilization of nitrogenous matters in liquids known as "tank-waters," produced by the rendering of meat, flesh, fatty matters, &c. The gelatinous or fibrinous matter in this water contains much nitrogen, which is useful for fertilizer purposes. This invention is a method of obtaining the nitrogenous matter in a form which can be easily dried without excessive evaporation. This is effected by rendering these soluble albuminoids or gelatinous nitrogenous substances insoluble in the tank-waters by the addition of certain acids and salts, whereby the nitrogenous matter is coagulated and precipitated, together with other fertilizing materials, and the precipitated matter separated by settling, decantation, and filtration or other suitable means and then dried. First the tank-water is tested to ascertain the quantity of nitrogenous matter it contains, and then the coagulants and precipitants are added in about the following proportions: Three parts of calcined and ground phosphate of lime, iron, or alumina or mixtures thereof are intimately mixed with sufficient sulphuric acid to make the phosphoric acid soluble, and enough water thereafter added (generally about five parts of water to three parts of phosphate) to keep it in a liquid state. Then the mixture so made is run directly into the tank-water in the proportion of one hundred parts of this mixture of acid water and phosphates to one hundred parts of solids originally in the tank-water and the whole kept at a temperature of about 180° Fahrenheit for about one hour to allow time for the coagulation of almost all the nitrogenous solids originally in the tank-water. Then the acid mixture is neutralized with calcined phosphate of lime, iron, or alumina or with lime, either powdered carbonate, such as limestone, or slaked lime, or preferably freshly-burned quicklime, either as powder or mixed with water. By this method the nitrogenous matters in the tank-waters are coagulated and precipitated, in conjunction with phosphoric acid, in the form of a highly-concentrated fertilizer, which after separation from the liquor by settling, decantation, and filtration, or by any other well-known means of separation, is in a condition in which it can be very easily dried into a marketable form. After drying the mass is soft and friable and can be reduced to powder very easily by any well-known means of pulverization and remains in a dry friable condition without any return of stickiness. The separated liquor may be run off as waste.

I do not confine myself absolutely to the proportions given above, as they may vary according to the nature of the nitrogenous matter in the tank-water; but such proportions are given as a general guide for ordinary tank-waters; or, if preferred, instead of adding the phosphates made soluble with sulphuric or other acids the tank-waters may be treated as follows: For every one hundred parts of solids contained in the tank-waters I add about forty parts of concentrated sulphuric acid of 66° Baumé or its equivalent quantity of chamber acid and keep the tank-water and acid mixture at a high temperature—from 180° Fahrenheit to boiling, and preferably boiling—for half an hour to one hour. This coagulates a large proportion of the gelatinous nitrogenous matter. Then I add to the acidified tank-water phosphates of lime, iron, or alumina or mixtures thereof, calcined and ground in a condition of fine powders in the proportion of sixty parts of powdered phosphates to each one hundred parts of solids in the tank-water. These phosphates should be preferably added slowly, with constant agitation, so that the acid may have sufficient time to decompose them, when they form a bulky flocculent precipitate in the tank-water, which causes the remainder of the nitrogenous gelatinous solids originally present in the tank-water to coagulate and precipitate. When the full allowance of the phosphate of alumina and phosphate of iron or mixtures thereof have been added, the liquid is kept at a boiling temperature, or nearly so, for about one hour to allow time for a full and complete reaction of the materials upon each other, and then the strongly-acid liquid is neutralized by the addition of powdered calcined phosphates of lime, iron, or alumina or with lime, either as carbonate, such as limestone, or as hydrate, such as slaked lime—or, preferably, as well-burned lime. The mixed phosphates may, if so desired, be mixed with water so as to flow to the acidified tank-water, or may be mixed previously with some of the tank-water under treatment; but it is preferable either to add them in dry powder or to mix with a portion of the tank-water under treatment. The addition of the excess of the aforementioned phosphates and of lime as a neutralizer causes the complete precipitation of the phosphates and of the nitrogenous matter, which would otherwise be lost in the liquor or waters run away as waste. At this stage of the operation the mixed phosphate, nitrogenous matter, and lime form a bulky flocculent precipitate in the liquid, and the clear neutral solution can be decanted and the residue filtered, preferably through "filter-presses," at a high pressure, whereby the bulk of the liquid is pressed out and the solids are obtained in a comparatively-dry cake, which can be easily dried into a marketable condition on an ordinary drying-floor or by any well-known drying method. The product is a bulky flocculent pulverulent impalpable precipitate composed of coagulated nitrogenous albuminoids combined with phosphatic material. The phosphates in this product, although insoluble in water, are highly soluble in citrate of ammonia, constituting what is known as "available phosphoric acid."

I may also state that the methods above described for treating tank-waters are applicable to any waters containing albuminoids.

I claim as my invention—

1. In the art of making fertilizers, the improvement consisting in first coagulating the soluble albuminoids and other nitrogenous matters in tank-waters or similar liquids by heating the same with phosphates and an acid or acids and then separating the precipitated matter and drying the same, all substantially as described.

2. In the art of making fertilizers, the improvement consisting of first coagulating the soluble albuminoids and other nitrogenous matters in tank-waters or similar liquids by heating the same with phosphates and an acid or acids, then treating them with a neutralizing agent and then separating the precipitated matter and drying the same, all substantially as described.

3. In the art of making fertilizers, the improvement consisting in first coagulating the soluble albuminoids and other nitrogenous matters in tank-waters or similar liquids by heating the same with phosphates of lime, iron, or alumina or mixtures thereof, in conjunction with sulphuric, hydrochloric, or phosphoric acid or mixtures thereof, neutralizing the acid by a further addition of calcined phosphates of lime, iron, or alumina or mixtures thereof and then separating the precipitated matter and drying the same, all substantially as described.

4. The herein-described fertilizing material, consisting of a bulky flocculent pulverulent impalpable precipitate composed of coagulated nitrogenous albuminoids of tank-waters and similar liquids, combined with phosphatic material insoluble in water, but highly soluble in citrate of ammonia, substantially as set forth.

In testimony whereof I have signed my name to this specification in the presence of two subscribing witnesses.

JOHN J. DUNNE.

Witnesses:
NEAL F. FRENCH,
THOS. H. STACKHOUSE.